June 19, 1928.
D. D. PARSHALL
1,674,262
PRESSURE REDUCING VALVE
Original Filed Jan. 23, 1924
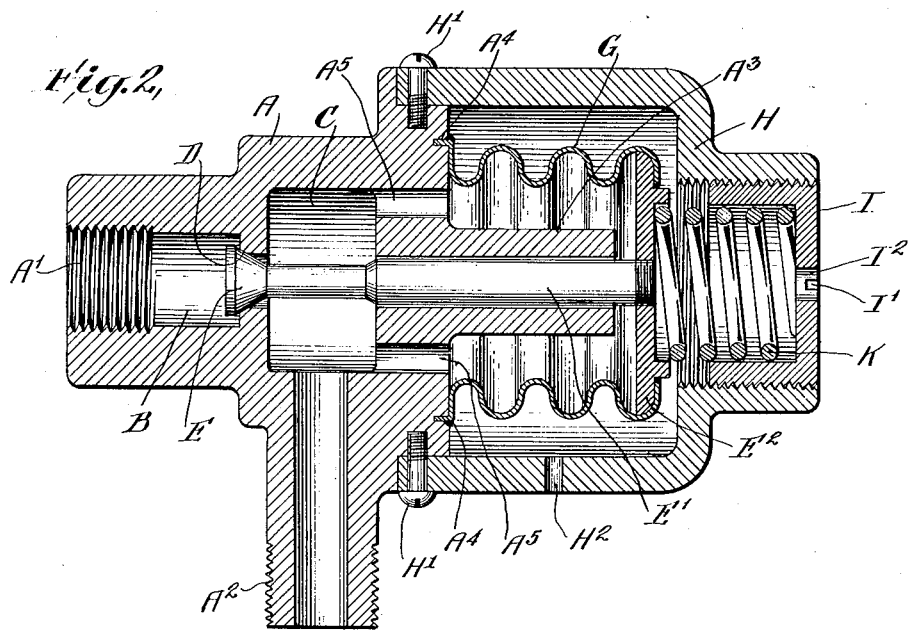
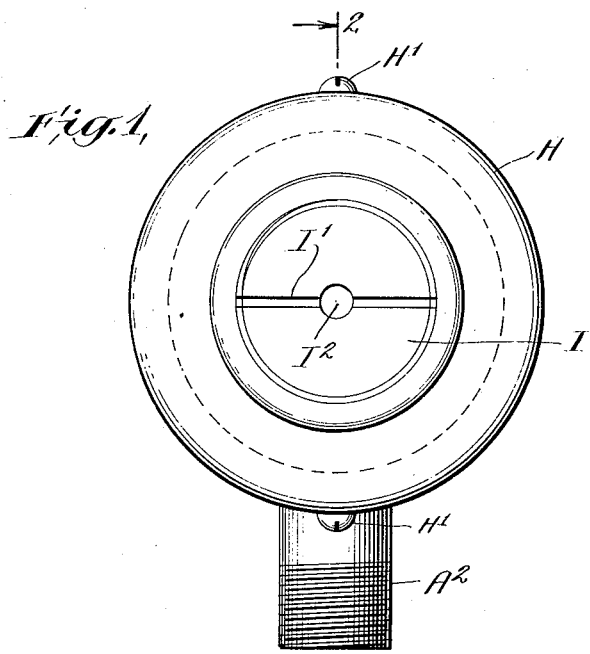
INVENTOR
DALLAS D. PARSHALL
BY
John E. Hubbell
ATTORNEY Patented June 19, 1928.

1,674,262

UNITED STATES PATENT OFFICE.

DALLAS D. PARSHALL, OF GLENBROOK, CONNECTICUT, ASSIGNOR TO THE JACK FROST COMPANY, OF STAMFORD, CONNECTICUT, A CORPORATION OF DELAWARE.

PRESSURE-REDUCING VALVE.

Application filed January 23, 1924, Serial No. 687,948. Renewed June 16, 1926.

My present invention consists in an improved expansion of pressure reducing valve especially adapted for use in a refrigeration system to discharge a refrigerant, supplied to the valve inlet under a relatively high pressure, as required to maintain a lower and substantially constant pressure at the valve outlet. The general object of my invention is to provide a valve characterized by its effectiveness and reliability under its intended conditions of use, and by its simplicity and relatively inexpensive construction.

The various features of novelty which characterize my invention are pointed out with particularity in the claims annexed to and forming a part of this specification. For a better understanding of the invention, however, its advantages and specific objects obtained with its use, reference should be made to the accompanying drawings and descriptive matter, in which I have illustrated and described a preferred embodiment of my invention.

Of the drawings:—

Fig. 1 is an end elevation; and

Fig. 2 is a section on the line 2—2 of Fig. 1.

The valve shown in the drawings comprises a body A, formed with an inlet chamber B, an outlet chamber C and a connecting port D. The casing body is threaded at A' for connection to the refrigerant supply piping and is provided with an outlet from the chamber C extending transversely to the axis of the port D and threaded at $A^2$ for connection to the cooling chamber or piping supplied with the refrigerant at reduced pressure. Flow through the port D is controlled by a valve E, movable into the inlet chamber B, away from the port D, to permit flow through the latter. The inlet chamber end of the port D is tapered to provide a conical seat for the valve E, which is conical in form. The stem E' of the valve E extends across the chamber C and through an elongated tubular guide in the form of a hollow boss $A^3$ on the outer wall of the valve body in axial alignment with the port D. At its outer end the stem E' is connected to a disk-like member $E^2$, forming the head or movable end member of an expansible and collapsible member G in the form of a metallic bellows. As shown, the inner end of the bellows is soldered or brazed in a circular groove $A^4$ formed in the outer wall of the valve body A. The outer end of the bellows is shown as spun over and brazed or soldered to the end member $E^2$, and the latter is formed with a threaded aperture into which the end of the valve stem E' is screwed, the joint between the stem E' and head $E^2$ being sealed by solder or brazing.

Free communication between the outlet chamber C and the interior of the member G is established by means of ports $A^5$. An adjustable valve opening force is impressed on the valve member E by means of a spring K, acting between the outer end of the head member $E^2$ and an adjustable follower I in the form of an externally threaded cup-shaped member, which is screwed into an aperture formed in a casing element H which surrounds the bellows G and is detachably secured to the valve body A as by means of the screws H'. Advantageously the member I is formed with a kerf I' to facilitate its valve adjusting rotation, and with a central port $I^2$ in its end, through which a small rod may be inserted to unseat the valve in case the latter sticks in its seat, as may occasionally occur, particularly after a period of non-use. A port $H^2$ is advantageously provided in the bottom wall of the casing H to discharge moisture which may condense in the casing.

In the contemplated use of the valve shown, the pressure of the fluid against the inner side of the bellows end head $E^2$ is normally balanced by the pressure of the atmosphere and the tension of the spring K, acting against the outer side of the head $E^2$. When the pressure in the chamber C and bellows becomes too small to balance the external force on the head $E^2$, the bellows collapses and opens or increases the extent of opening of the valve E, thereby increasing the pressure in the chamber C until the bellows is again extended and the flow through the port D thereby throttled. The pressure of the refrigerant supplied to the chamber B may vary through quite wide limits. For example, the normal refrigerant supply pressure when the compressor (not shown) of the system is in operation, may be 45 pounds or so per square inch, but ordinarily the compressor is operated intermittently, and when the compressor is stopped, as it may be for a considerable period, the pressure may drop to 20 pounds or so. With the described construction, and with the diameter of the head $E^2$ sufficiently large in comparison with that of the port D, the variations in pressure in the supply chamber B do not materially affect the pressure maintained in the outlet chamber C and there is small tendency for the building up of the pressure in the chamber C when the compressor stops, which characterizes the action of expansion valves now in common use in refrigeration systems. With the spring H arranged as shown, the operation of the valve does not depend on the resiliency of the metallic bellows G. The boss $A^3$ forms a stop limiting the collapsing movement of the bellows G and prevents the deformation of the latter which would result from its unrestrained collapsing movement. The boss $A^3$ provides a bearing for the valve sufficiently elongated and so disposed as to practically eliminate all tendency of the parts to cramp and bind. The spring K is not exposed to contact with the refrigerant and the resultant corrosion. The spring K may readily be adjusted and it and the bellows G are well protected by the casing H. Furthermore, the above mentioned mechanical and operating advantages are obtained in a structure which is compact and relatively inexpensive to construct.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An expansion valve comprising a valve body formed with an inlet chamber, an outlet chamber, a port connecting said chambers, and with an opening co-axial with said port in the side of the outlet chamber wall opposite said port, a valve controlling said port and comprising a stem portion extending across said outlet chamber and projecting through said opening, an expansible chambered member surrounding the projecting end of said stem and having a closed outer end to which said stem is connected and having an inner end connected to the valve body, the latter being formed with an opening connecting the interior of said expansible member and outlet chamber, and with a boss extending into said expansible member and through which the first mentioned opening extends, said boss forming a stop limiting the collapsing movement of the latter and providing an elongated bearing for the valve stem, a casing supported by said body, enclosing said member and provided with an adjustable spring abutment, and a spring interposed between said abutment and the movable end of said member.

2. An expansion valve comprising a valve body formed with an inlet chamber, an outlet chamber, a port connecting said chambers, and with an opening co-axial with said port in the side of the outlet chamber wall opposite said port, a valve controlling said port and comprising a stem portion extending across said outlet chamber and projecting through said opening, an expansible chambered member surrounding the projecting end of said stem and having a closed outer end to which said stem is connected and having an inner end connected to the valve body, the latter being formed with an opening connecting the interiors of said expansible member and outlet chamber, and with a boss extending into said expansible member and through which the first mentioned opening extends, said boss forming a stop limiting the collapsing movement of the latter and providing an elongated bearing for the valve stem, and a casing supported by said valve body and surrounding said member and formed with a threaded opening at its outer end, a nut screwed into said opening, a spring interposed between said nut and the movable end of said member, said nut being formed with an opening permitting the insertion of a device for engaging the member to collapse the latter in case the valve sticks.

Signed at New York city, in the county of New York and State of New York this 22nd day of January, A. D., 1924.

DALLAS D. PARSHALL.